Nov. 25, 1969    N. FREEDMAN    3,480,951
RETRODIRECTIVE PHASE SHIFTING TRANSPONDER
Filed May 15, 1968
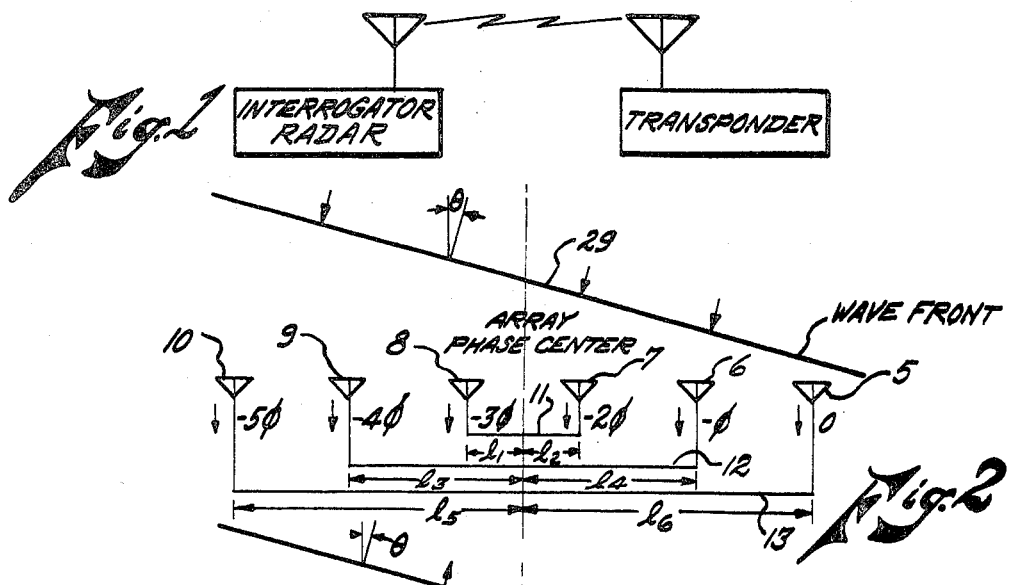
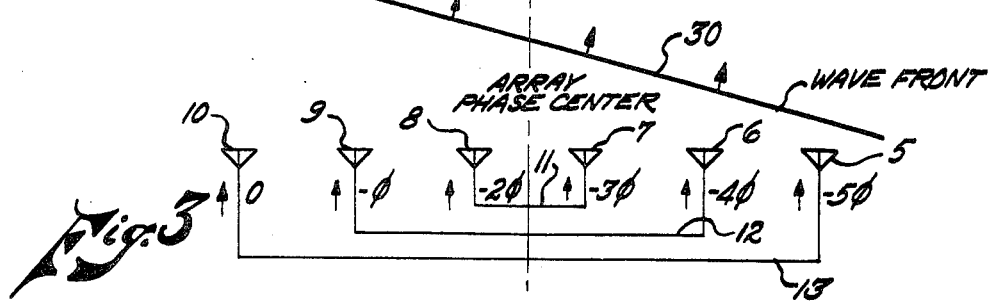
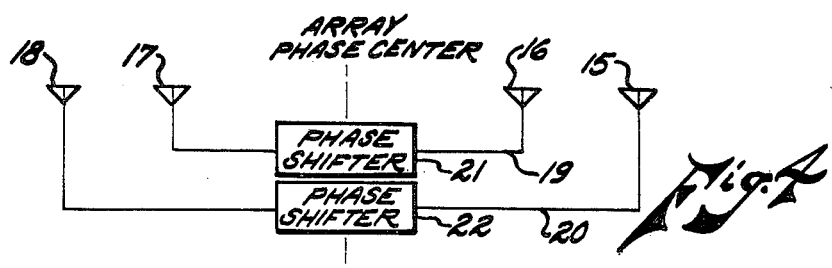
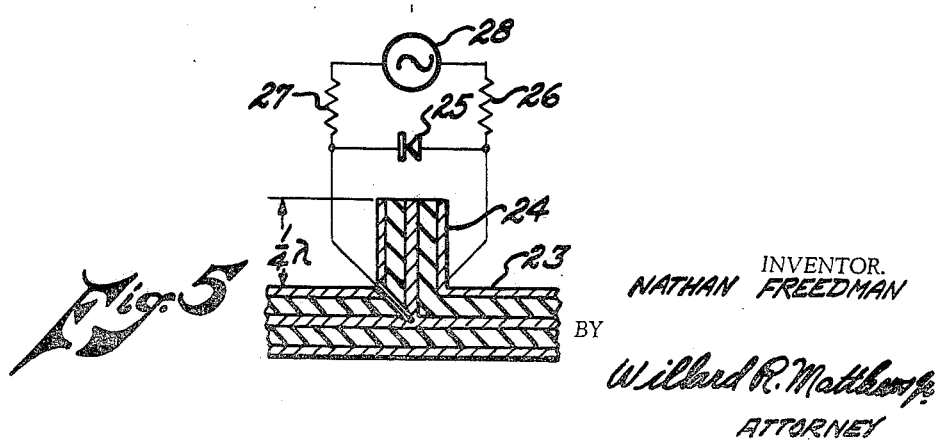
INVENTOR.
NATHAN FREEDMAN
BY
Willard R. Matthews Jr.
ATTORNEY

3,480,951
RETRODIRECTIVE PHASE SHIFTING TRANSPONDER

Nathan Freedman, West Newton, Mass., assignor to the United States of America as represented by the Secretary of the Air Force
Filed May 15, 1968, Ser. No. 729,326
Int. Cl. G01s 9/56; H04b 7/00
U.S. Cl. 343—6.8     5 Claims

ABSTRACT OF THE DISCLOSURE

A radar beacon system having a pseudo-passive transponder. The transponder comprises a retrodirective antenna array that effectively re-radiates the interrogating signal back toward the interrogator and means for shifting the received interrogating signal 180° before re-radiating it. A particular embodiment of the invention comprehends a Van Atta antenna array having conjugate members of radiating element pairs connected by coaxial cables equidistant from the array center. A quarter wave length stub is located on each coaxial cable at the array center and is periodically shorted out by a diode that is biased off and on by a square wave generator.

Background of the invention

This invention relates in general to radar beacon systems and particularly to pseudo-passive radar beacon transponders that utilize retrodirective antenna arrays.

Radar beacon systems are commonly used to enhance radar echoes from particular targets and to identify certain objects such as friendly aircraft. The system comprises an interrogator and a transponder. The interrogator can be a conventional search radar that transmits microwave signals and derives information from returned echoes. The transponder usually includes a transmitter and a receiver, receiving and transmitting antennas, and means for modulating or coding the signal to be returned. In operation, a directional signal transmitted by the interrogator is received by the transponder. The transponder, in turn, modulates the signal with an identifying code, and omnidirectionally transmits it, usually at an increased power level. The transponder then is a device that is normally quiescent or passive and in effect acts as an amplifier of radar echoes. Beacon systems may be of the ground to air, air to ground, or air to air varieties. They find particular use when echoes from a simple radar set are too weak to be observed, such as for instance those from a small airplane at a great distance. Under other circumstances strong echoes from numerous buildings, hills, or mountains mask weaker echoes from targets of greater interest. Furthermore, for the benefit of aircraft radar sets, it is sometimes desired to mark some particular place on the ground that gives no distinguishing echo.

Transponder receiver, transmitter, coding equipment and power amplification circuits are generally complex, expensive, and add substantial weight to airborne units. It would be desirable, therefore, to reduce cost and weight and to increase reliability by simplification if the same could be accomplished without sacrifice to transponder effectiveness. The present invention is directed toward accomplishing this.

Summary of the invention

The radar beacon system disclosed herein comprehends the use of a novel, simplified, pseudo-passive transponder. A retrodirective antenna array is utilized to redirect the received radar signal to the interrogator, thus providing maximum efficiency and reutrned signal strength without the necessity of additional power amplification at the transponder. The Van Atta type antenna array is particularly well suited for such an application and is used in the preferred embodiment of the present invention. Such an array comprises a plurality of pairs of radiator elements wherein conjugate elements are connected by cables of equal length. An antenna thus constructed inherently reflects an incoming wave back to the transmitter station. It is capable of reflecting a wave incident at any angle from end-fire to broadside. Its gain, therefore, can be very high without requiring precise attitude stabilization.

The present invention also greatly simplifies the coding equipment and substantially eliminates the modulation power requirements of the transponder. Coding is provided in beacon systems to permit positive identification of the returned signal by the interrogator. This has been accomplished in conventional beacon systems by amplitude modulation or pulsing of the received interrogator signal. The transponder comprehended herein accomplishes the same end by phase shifting the interrogating signal 180° before re-radiating it to the interrogator. This is accomplished by alternately changing the length of cable between conjugate radiator element pairs by one-half wavelength. A simple circuit comprising a switching diode connected across a quarter wavelength stub on the connecting cable effectively changes the length of such cable by one-half wavelength. The diode is baised off and on at an appropriate frequency by a square wave geneartor. Phase modulation, and hence signal identification, is thus provided with a minimum number of components and no modulation power requirement other than the square wave generator.

It is a principal object of this invention to provide a new and improved radar beacon system having a pseudo-passive transponder capable of phase modulation and retrodirectively reradiating signals received from an interrogator.

It is another object of the invention to provide a radar beacon system transponder having a minimum number of components.

It is another object of the invention to provide a radar beacon system transponder that is lightweight and inexpensive.

It is another object of the invention to provide a radar beacon system transponder that has improved reliability.

It is another object of the invention to provide a radar beacon system transponder having reduced signal modulating power requirements.

It is another object of the invention to provide a radar beacon system transponder comprising the combination of a Van Atta type antenna array and signal phase shifting means.

These, together with other objects, advantages and features of the invention will become more apparent from the following detailed description when taken in conjunction with the illustrative embodiments in the accompanying drawings.

Description of the drawings

FIGURE 1 is a block diagram illustrating the two major components of a radar beacon system;

FIGURE 2 is a schematic diagram illustrating the principal of operation of a Van Atta type antenna array with respect to a received electromagnetic wave;

FIGURE 3 is a schematic diagram illustrating the principal of operation of a Van Atta antenna array with respect to a transmitted or reflected electromagnetic wave;

FIGURE 4 is a schematic drawing illustrating one preferred embodiment of the present invention; and FIGURE 5 is an illustration of a sectionalized coaxial cable and associated control circuitry in schematic form as comprehended by the phase shifting feature of the invention.

Description of the preferred embodiments

Referring now to FIGURE 1, there is illustrated thereby the two major components of a radar beacon system. The interrogator, which for the purposes of the present invention can be any conventional radar suitable for beacon interrogation, transmits microwave signals to the transponder. The transponder of the present invention is pseudo-passive and in this respect differs from the usual state-of-the-art transponder. By pseudo-passive is meant that the received signal is not detected and processed at the transponder, but is offset in frequency using a diode modulator and the re-radiated.

The retrodirectional re-radiation feature of the invention is accomplished by the use of a Van Atta type antenna array. A Van Atta antenna array consists of a number of pairs of interconnected antenna radiator elements arranged to provide a large backscattering cross-section. If the location of each antenna is defined to be that of its phase center, then the phase center of each pair of radiating elements is the mid point of the line joining the phase centers of the two antenna elements comprising the pair. For effective arraying it is required that the phase center of all pairs of radiating elements be closely coincident (within some fraction of a wavelength). Another requirement for effective arraying is that the phase lengths between antennas of all pairs be equal. In practice, this is accomplished by careful control of interconnecting cable lengths.

The manner in which such an antenna array operates can be more clearly understood from the following discussion of FIGURES 2 and 3, reference to which is now made. Antenna radiator elements 7 and 8 comprise a pair and are positioned equidistant from the array phase center by cable 11. Similarly, radiator elements 6 and 9 are a pair connected by cable 12 and elements 5 and 10 are also a pair connected by cable 13. The geometry of the array is such that cable sections $l_1 = l_2$, $l_3 = l_4$ and $l_5 = l_6$. Equal line lengths are needed so that an equal phase delay occurs in each interconnecting cable. To understand how the array operates, consider plane wave 29 incident upon the array as illustrated in FIGURE 2. This plane wave 29 induces signals in each antenna element having the phase shown in FIGURE 2. After the energy has traveled through the equal length interconnecting cables, the relative phase of the re-radiated waves are reversed as shown in FIGURE 3. A study of these FIGURES 2 and 3 shows that the relative phases of these waves are of the correct value to cause the antenna array to re-radiate wave 30 back in the direction wave 29 arrived.

The scattering cross-section of such an antenna array can be derived from the expression $$\sigma = 4\pi R^2 \frac{P_R{}^s}{P_i} \quad (1)$$

where:

$\sigma$ is the scattering cross-section, $P_i$ is the power density of the plane wave incident upon the reflector, and $P_R{}^s$ is the reflected power density at a receiver a distance R away from the reflector.

The power received by the antenna array is equal to the product of the effective area $A_e$ of the array and the incident power density, $P_i$. Assuming no reflective or dissipative losses in the array, all of the received power is re-radiated and the reflected power density at the receiver a distance, R, from the array is $$P_R{}^s = \frac{A_e P_i G}{4\pi R^2} \quad (2)$$

where G is the gain of the array. For any antenna, the gain and the effective area are related by $$G = 4\pi A_e / \lambda^2 \quad (3)$$

where $\lambda$ is the free space wavelength. The scattering cross section of the array is therefore $$\sigma = \frac{G^2 \lambda^2}{4\pi} \quad (4)$$

The basic concept of the present invention to to utilize the type of antenna array described above as a radar beacon system transponder. This is accomplished by using a simple phase modulating scheme in combination with the antenna array. In essence, a 180° phase shift is switched in and out of the cables connecting conjugate pairs of the antenna radiating elements. Such switching is done at the desired offsetting frequency.

Referring now to FIGURE 4, there is illustrated a simplified schematic of the novel combination which comprises the transponder of this invention. Antenna radiator elements 16 and 17 are conjugate elements of one antenna pair positioned equidistant from the array phase center by cable 19. Antenna radiator elements 15 and 18 together with cable 20 comprise a second such antenna pair. Phase shifting is accomplished for these antenna pairs by phase shifters 21 and 22. The phase shifters should be bilateral, of low loss, and well matched at both terminals. By way of example, a particular embodiment of such a phase shifter is illustrated by FIGURE 5. Such a phase shifter consists of a coaxial cable 23 having a quarter wavelength stub 24 located at the array phase center. The coaxial cable connects conjugate radiator elements of an antenna pair. A switching diode 25 is connected across the quarter wavelength stub as shown. The diode is switched off and on at the appropriate frequency by means of square wave generator 28 as applied through current limiting resistances 26 and 27.

In operation, the signal received by elements 17 and 18 is phase modulated and radiated by elements 15 and 16. It has been found that with an ideal switching element each sideband is $2/\pi$ down from the carrier, or approximately a 2 db loss. The gain of a retrodirective pair is 3 db greater than that of either element, but has the same directive pattern as either element. Any number of pairs can be used as long as they are arranged about the same axis of symmetry. The gain will continually increase, but the directivity will always be that of a single element.

Although the invention disclosed herein has been decribed with reference to specific embodiments, it is not intended that it be so limited. Since many variations and alternative embodiments within the spirit and scope of the invention will occur to those skilled in the art, it is understood that any limitation thereof will be defined by the claims appended hereto.

What is claimed is:

1. A radar beacon system having an interrogator and a transponder, said transponder comprising a retrodirective antenna array, said antenna array being adapted to receive signals transmitted by said interrogator and to re-radiate said received signals back to said interrogator, and means for shifting the phase of said received signals prior to re-radiation thereof, said retrodirective antenna array comprising a plurality of pairs of antenna radiator elements, conjugate radiator elements benig electrically connected equidistant from the array center, said means for shifting the phase of said received signals comprising first and second conductors disposed between conjugate radiator elements of each pair of radiator elements, said first conductor being one half wavelength longer than said second conductor and means for alternately connecting said conjugate radiator elements to said first and second conductors.

2. A radar beacon system having an interrogator and a transponder, said transponder comprising a retrodirective antenna array, said antenna array being adapted to receive signals transmitted by said interrogator and to re-radiate said received signals back to said interrogator, and means for shifting the phase of said received signals prior to re-radiation thereof, said retrodirective antenna array comprising a plurality of pairs of antenna radiator elements, conjugate radiator elements being electrically connected equidistant from the array center, said means for shifting the phase of said received signals comprising a coaxial cable member connecting conjugate radiator elements of each pair of radiator elements, a one-quarter wavelength stub disposed on each said coaxial cable at the array center, and means for periodically shorting out said one-quarter wavelength stubs.

3. A radar beacon system as defined in claim 2 wherein said means for periodically shorting out each said one-quarter wavelength stubs comprises a diode, said diode being connected in said coaxial cable to effectively short out said stub when biased to conduction, and a square wave generator connected to said diode and adapted to alternately bias it to conduction and nonconduction.

4. A radar transponder, comprising an antenna array, said antenna array having a plurality of pairs of antenna radiator elements, equidistant from the array center, first and second electrical conductors disposed between conjugate radiator elements of each pair thereof, said first conductor being one-half wavelength longer than said second conductor, and means for alternately connecting said conjugate radiator elements to said first and second conductors.

5. A radar transponder as defined in claim 4 wherein said antenna array is of the Van Atta type.

References Cited

UNITED STATES PATENTS

| | | | |
|---|---|---|---|
| 3,196,438 | 7/1965 | Kompfner | 343—100 |
| 3,314,067 | 4/1967 | Rutz. | |
| 3,394,374 | 7/1968 | Weiss | 343—100 |

OTHER REFERENCES

"Technique for Amplitude Modulating a Van Atta Radar Reflector," by L. H. Bauer, Proceedings of the IRE, vol. 49, No. 2, March 1961, pages 634–635.

RICHARD A. FARLEY, Primary Examiner

M. F. HUBLER, Assistant Examiner

U.S. Cl. X.R.

343—100